US010923138B2

(12) United States Patent
Yang et al.

(10) Patent No.: US 10,923,138 B2
(45) Date of Patent: Feb. 16, 2021

(54) SOUND COLLECTION APPARATUS FOR FAR-FIELD VOICE

(71) Applicant: Alibaba Group Holding Limited, Grand Cayman (KY)

(72) Inventors: Zhihui Yang, Beijing (CN); Qiang Fu, Beijing (CN); Zhijie Yan, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/186,301

(22) Filed: Nov. 9, 2018

(65) Prior Publication Data
US 2019/0147900 A1 May 16, 2019

(30) Foreign Application Priority Data

Nov. 10, 2017 (CN) .......................... 201711107934.5

(51) Int. Cl.
*H04B 3/20* (2006.01)
*G10L 21/0232* (2013.01)
(Continued)

(52) U.S. Cl.
CPC .......... *G10L 21/0232* (2013.01); *G10L 15/20* (2013.01); *G10L 15/22* (2013.01);
(Continued)

(58) Field of Classification Search
CPC ..... G10L 21/0232; G10L 15/20; G10L 15/22; G10L 21/0208; G10L 2021/02082;
(Continued)

(56) References Cited

U.S. PATENT DOCUMENTS 4,013,841 A    3/1977  Ohkubo et al.
8,005,682 B2   8/2011  Archibald
(Continued)

FOREIGN PATENT DOCUMENTS

CN    1375178 A    10/2002
CN    2590317 U    12/2003
(Continued)

OTHER PUBLICATIONS https://www.eetimes.com/document.asp?doc_id=1317560# (Year: 2016).*

(Continued)

*Primary Examiner* — Ammar T Hamid
(74) *Attorney, Agent, or Firm* — Lee & Hayes, P.C.

(57) ABSTRACT

A sound collection apparatus for far-field voice includes a multi-channel analog sound receiver configured to convert an obtained sound signal into an electrical signal; a first analog-to-digital converter coupled to the multi-channel analog sound receiver and configured to convert the electrical signal into a digital signal; and an interface controller coupled to the analog-to-digital converter and configured to transmit the digital signal to a control device via a preset interface. Using the above solutions, the technical problems of high hardware cost and unguaranteed performance of existing sound collection devices can be solved, and the technical effects of effectively reducing the hardware cost and the difficulties of development are achieved.

17 Claims, 7 Drawing Sheets

(51) Int. Cl.
  *H04R 1/40* (2006.01)
  *H04R 3/00* (2006.01)
  *G10L 15/20* (2006.01)
  *H04R 5/027* (2006.01)
  *G10L 15/22* (2006.01)
  *G10K 11/16* (2006.01)
  *G10L 21/0208* (2013.01)

(52) U.S. Cl.
  CPC ............. *H04R 1/406* (2013.01); *H04R 3/005* (2013.01); *H04R 5/027* (2013.01); *G10L 21/0208* (2013.01); *G10L 2021/02082* (2013.01); *H04R 2201/403* (2013.01); *H04R 2420/09* (2013.01); *H04R 2499/15* (2013.01)

(58) Field of Classification Search
  CPC ........ H04R 1/406; H04R 3/005; H04R 5/027; H04R 2201/403; H04R 2420/09; H04R 2499/15
  USPC .......................................................... 381/66
  See application file for complete search history.

(56) References Cited

U.S. PATENT DOCUMENTS

| | | | |
|---|---|---|---|
| 8,184,822 | B2 | 5/2012 | Carreras et al. |
| 9,659,555 | B1 | 5/2017 | Hilmes et al. |
| 2009/0112603 | A1 | 4/2009 | Archibald et al. |
| 2016/0260441 | A1* | 9/2016 | Muehlhausen ......... G06F 3/011 |
| 2017/0243577 | A1* | 8/2017 | Wingate .................. G10L 15/20 |
| 2019/0096398 | A1* | 3/2019 | Sereshki ............. G10L 21/0208 |

FOREIGN PATENT DOCUMENTS

| | | |
|---|---|---|
| CN | 201781567 U | 3/2011 |
| CN | 203522988 U | 4/2014 |
| CN | 106601225 A | 4/2017 |
| WO | WO2014040667 A1 | 3/2014 |

OTHER PUBLICATIONS https://www.hardwaresecrets.com/datasheets/ALC892-CG_DataSheet_1.3.pdf (Year: 2016).*

Olsen, "Conexant Launches High-definition Voice Capture IC", retrieved on Jan. 19, 2019 at <<https:l/www.businesswire.com/news/home/20121217005057/en/Conexant-Launches-High-Definition-Voice-Capture-IC>>, Business Wire, Dec. 17, 2012.

The PCT Search Report and Written Opinion dated Feb. 4, 2019 for PCT Application No. PCT/US2018/060180, 8 pages.

Translation of Chinese Office Action dated Jan. 22, 2020, from corresponding CN Patent Application No. 201711107934.5, 7 pages.

Translation of Chinese Search Report dated Jan. 15, 2020, from corresponding CN Patent Application No. 201711107934.5, 2 pages.

* cited by examiner

SOUND COLLECTION APPARATUS FOR FAR-FIELD VOICE

CROSS REFERENCE TO RELATED PATENT APPLICATIONS

This application claims priority to Chinese Patent Application No. 201711107934.5, filed on 10 Nov. 2017, entitled "Sound Collection Apparatus for Far-Field Voice," which is hereby incorporated by reference in its entirety.

TECHNICAL FIELD

The present disclosure relates to the technical field of hardware devices, and particularly to sound collection apparatuses for far-field voice.

BACKGROUND

With the rapid development of smart devices and the increasing demand for human-computer interactions, original control methods for smart devices appear to be relatively complicated.

As a relatively simple interaction and control method, voice interaction can greatly improve the convenience of controlling smart devices. The voice interaction is a method of communications using natural voice. The creation of this type of method enables all smart devices perform communications in a unified and simple manner, which reduces the complexity of controlling the smart devices.

However, as voice interaction is bound to involve an acquisition of voice, an existing collection structure generally has the problems of high hardware development cost and low performance, and applying thereof to general household devices or to relatively low-cost devices is obviously not suitable.

No effective solution has yet been proposed in response to the above problems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a sound collection apparatus for far-field voice, so as to achieve the technical effects of reducing the cost of a sound collection device while fully guaranteeing the system performance. The apparatus includes a multi-channel analog sound receiver configured to convert an obtained sound signal into an electrical signal; a first analog-to-digital converter coupled to the multi-channel analog sound receiver and configured to convert the electrical signal into a digital signal; and an interface controller coupled to the analog-to-digital converter and configured to transmit the digital signal to a control device via a preset interface. In the embodiments of the present disclosure, an obtained sound signal is converted into an electrical signal by a multi-channel analog sound receiver, and the electrical signal is converted into a digital signal by an analog-to-digital converter. The converted digital signal is transmitted to a control device through an interface controller for processing sound data. The sound collection apparatus is relatively simple to implement and has a lower cost. As such, the technical problems of high hardware cost and unguaranteed performance of existing sound collection devices can be solved, and the technical effects of effectively reducing the hardware cost and the difficulties of development are achieved.

BRIEF DESCRIPTION OF THE DRAWINGS

Accompanying drawings described herein are provided for a further understanding of the present disclosure, and constitute a part of the present disclosure, which are not intended to limit the present disclosure. In the drawings.

DETAILED DESCRIPTION

In order to make the goals, technical solutions, and advantages of the present disclosure more comprehensible, the present disclosure will be further described in detail hereinafter in conjunction with implementations and drawings. The illustrative implementations of the present disclosure and the description thereof are intended to explain the present disclosure, but are not intended to limit the present disclosure.

Figure 1:
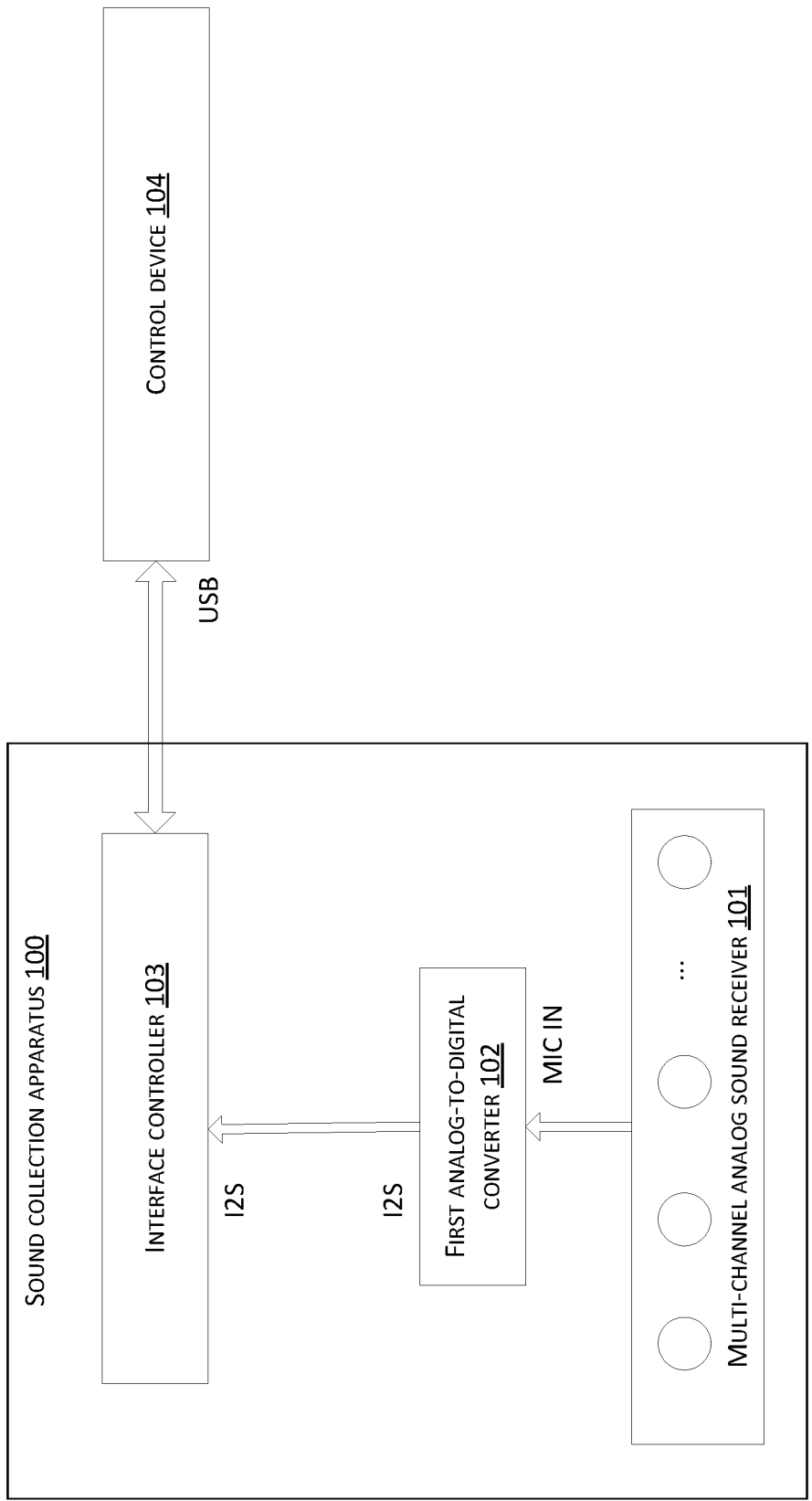
FIG. 1 is a schematic structural diagram of a sound collection apparatus for far-field voice according to the embodiments of the present disclosure.

As shown in FIG. 1, the present disclosure provides a sound collection apparatus 100 used for far-field voice, which may include a multi-channel analog sound receiver 101, a first analog-to-digital converter 102, and an interface controller 103.

In an implementation, a multi-channel analog sound receiver 101 is configured to convert an acquired sound signal into an electrical signal, and is an energy conversion device.

The multi-channel analog sound receiver 101 can be a two-channel, four-channel or eight-channel analog sound receiver, or the like. A specific number of selected channels may be selected according to actual needs, which is not limited in the present disclosure. For example, the above multi-channel analog sound receiver may be a microphone array.

For example, a 4 MIC, i.e., a 4-channel analog sound receiver, may be selected. The MIC is selected for sound acquisition, and is mainly to ensure sufficient far-field collection effect. The MIC has advantages such as a high signal-to-noise ratio and a high sensitivity. When selecting a multi-channel analog sound receiver, a multi-channel analog sound receiver having a signal-to-noise ratio of 65 dB or more may be selected.

A first analog-to-digital converter 102 is coupled to multi-channel analog sound receiver 101, and is configured to convert the electrical signal into a digital signal. For example, the following types of analog-to-digital converters can be used: Conexant Semiconductor Company's CX20810-11Z, Conexant Semiconductor Company's CX20811-11Z, Nuvoton Technology Corporation Limited's NAU85L40YG, Nuvoton Technology Corporation Limited's NAU85L40BYG, X-Powers Technology's AC108.

It should be noted that models of the analog-to-digital converter that are listed are only exemplary. In practical implementations, other types of analog-to-digital converters may be used, and chips and devices capable of implementing an analog signal of a voice signal, etc., can be selected and used, which are not limited by the present disclosure.

The interface controller 103 is coupled to the analog-to-digital converter 102, and is configured to transmit the digital signal to the control device 104 via a preset interface. Preferably, ALC4042 chip of Realtek Semiconductor can be selected, and correspondingly, the preset interface is a USB interface. In practical implementations, other types of interfaces may also be selected according to actual conditions, for example, a headphone interface, etc.

Figure 2:
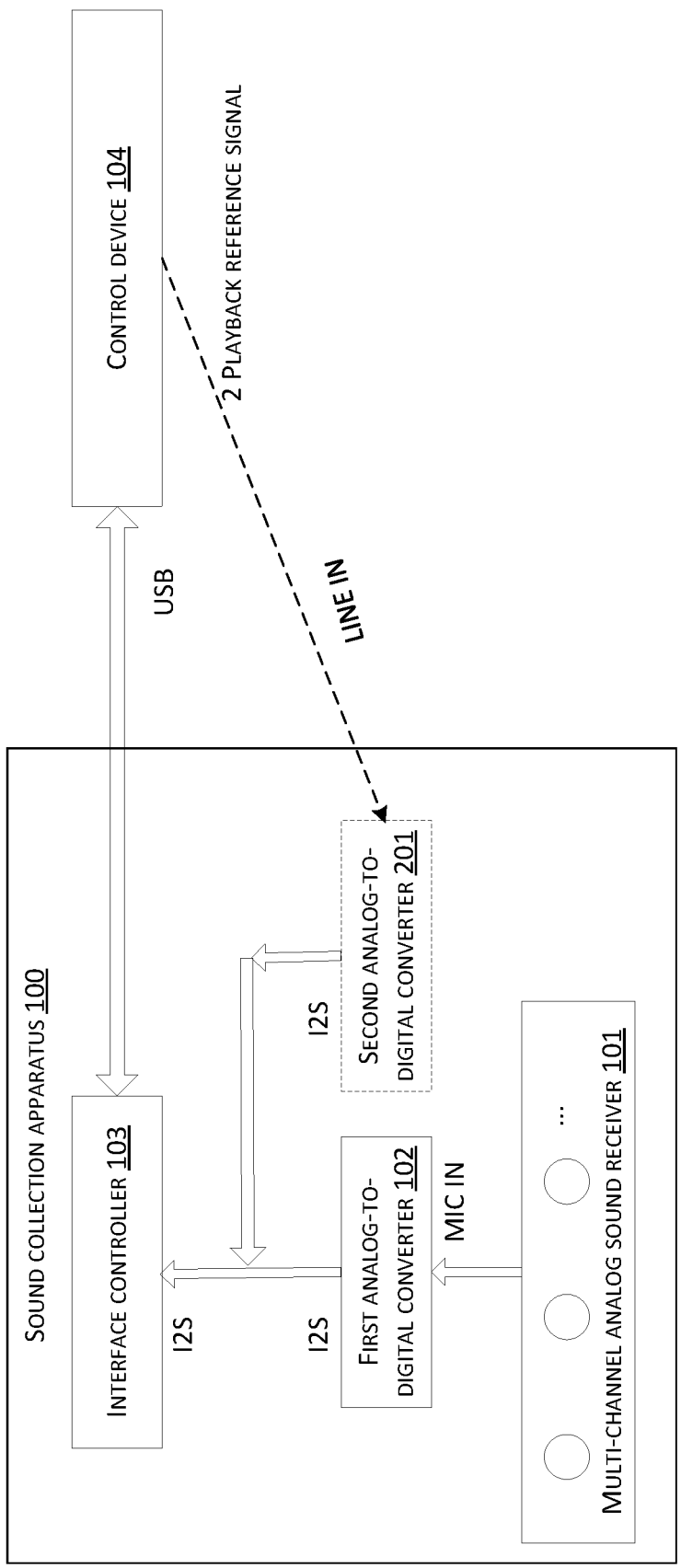
FIG. 2 is another schematic structural diagram of a sound collection apparatus for far-field voice according to the embodiments of the present disclosure.

In view of sounds sometimes being generated the control device 104 and are noises themselves, the accuracy of a microphone signal is affected. In order to eliminate the influence of these noises, these pieces of data can be obtained to de-noise a sound signal obtained based on the multi-channel analog sound receiver 101. As such, as shown in FIG. 2, the above-mentioned sound collection apparatus 100 for far-field voice may further include a second analog-to-digital converter 201 coupled between the control device and the interface controller and configured to receive and convert a playback reference signal of the control device to a digital signal, and transmit the digital signal to the interface controller, the playback reference signal being used for de-noising the sound signal.

The playback reference signal can be used as an analog reference signal for de-noising the sound signal obtained by the multi-channel analog sound receiver. The playback reference signal is a signal from the control device. For example, the playback reference signal can be transmitted to the sound collection apparatus in a variety of ways, for example, through a wired means or a wireless means to the sound collection apparatus. For example, the wired means may be a transmission to the sound collection apparatus through a dedicated connection line, and the wireless means may be a direct transmission to the sound collection apparatus through a wireless signal, which are not limited in the present disclosure. In this example, the wired means is used as example. As shown in FIG. 2, a dedicated connection line is connected from the control device, and a playback reference signal of the control device is transmitted to the second analog-to-digital converter 201 through this connection line. The second analog-to-digital converter 201 converts the playback reference signal into a digital signal, i.e., an analog reference channel is formed through this line for transmitting playback reference signals.

Figure 3:
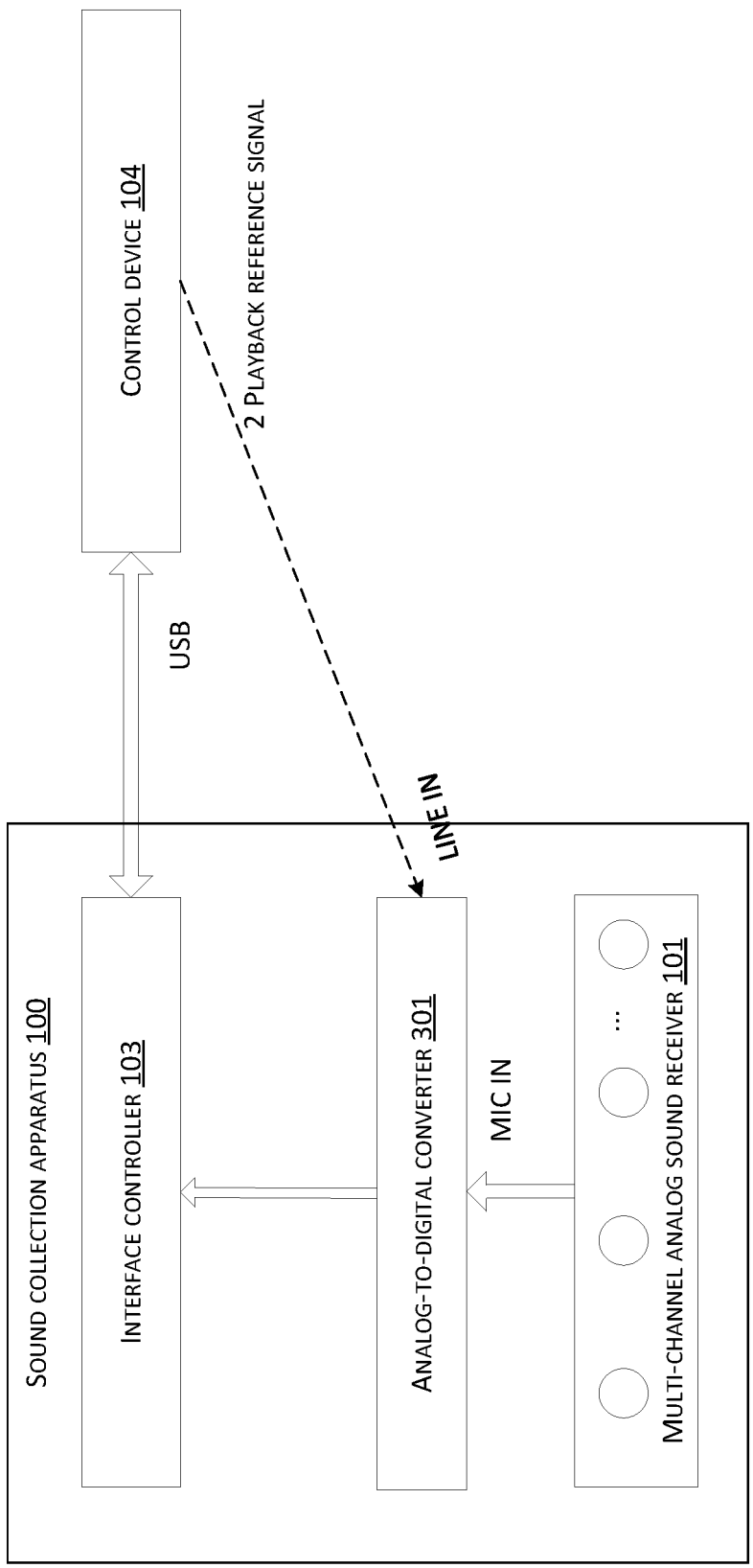
FIG. 3 is another schematic structural diagram of a sound collection apparatus for far-field voice according to the embodiments of the present disclosure.

In an embodiment, as shown in FIG. 3, the second analog-to-digital converter 201 and the first analog-to-digital converter 102 are integrated in an analog-to-digital converter 301. The integrated analog-to-digital converter performs analog-to-digital conversion processing for both microphone signals and playback reference signals.

In view of signals from two directions, one is from the multi-channel analog sound receiver 101 and the other is from the control device 104. During analog-to-digital conversion, the second analog-to-digital converter 201 and the first analog-to-digital converter 102 may also be separately deployed, and each perform analog-to-digital conversion independently on one of the signals from one direction, so that the signals from these two directions do not affect each other when being subjected to analog-to-digital conversion.

Considering that an actual analog reference channel can be two-channel analog reference channels, an analog microphone can be a 4-channel analog microphone. Correspondingly, order to meet the requirements, the second analog-to-digital converter 201 and the first analog-to-digital converter 102 can be four-channel analog-to-digital conversion chip. Serial transmission of 8 channels of data can be realized through a TDM (Time Division Multiplexing) mode of I2S (Inter-IC Sound bus, an integrated circuit with a built-in audio bus) interface, and extra two analog-to-digital conversion chips can be used for expansion.

Figure 4:
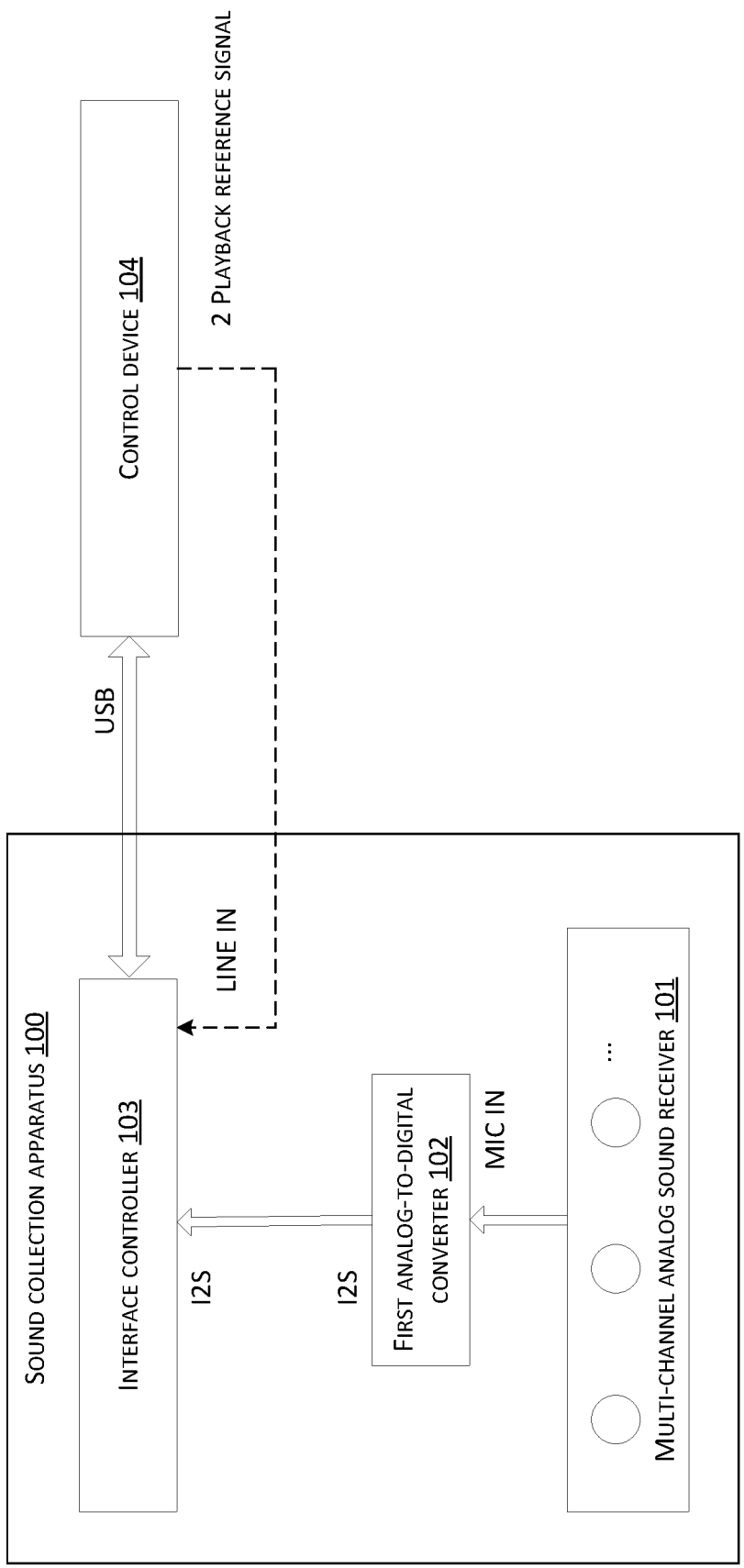
FIG. 4 is another schematic structural diagram of a sound collection apparatus for far-field voice according to the embodiments of the present disclosure.

In the above example, performing an analog-to-digital conversion of a playback reference signal by the second analog-to-digital converter 201 is used as an example. In practical implementations, the playback reference signal may also be the one as shown in FIG. 4. The playback reference signal is directly transmitted to the interface controller, and is converted into a digital signal by an analog-to-digital conversion unit in the interface controller. In practical implementations, a specific method of configuration can be selected according to requirements and actual conditions, which is not limited in the present disclosure.

However, it is worth noting that the number of channels of an analog reference channel and the number of channels of an analog microphone are only described as an example, and may be selected as needed in practical implementations, which is not limited in the present disclosure. Further, the number of channels of an analog-to-digital conversion chip can be selected according to the number of channels of a corresponding analog reference channel and the number of channels of an analog microphone.

The control device 104 may include, but is not limited to, at least one of the following: a computer, a television, a set top box, a robot, or a smart speaker.

In an embodiment, the sound collection apparatus for far-field voice may be provided as an external device or integrated in the control device. Which method is specifically adopted may be selected according to actual requirements, which is not limited in the present disclosure.

The obtained sound signal is converted into an electrical signal by the multi-channel analog sound receiver. The electrical signal is converted into a digital signal by the analog-to-digital converter, and the converted digital signal is transmitted to the control device through the interface controller for processing sound data. The sound collection apparatus is simpler to implement and has a lower cost, thus solving the technical problems of high hardware cost and unguaranteed performance of existing sound collection devices, and achieving the technical effects of effectively reducing the hardware cost and the difficulties of development.

Figure 5:
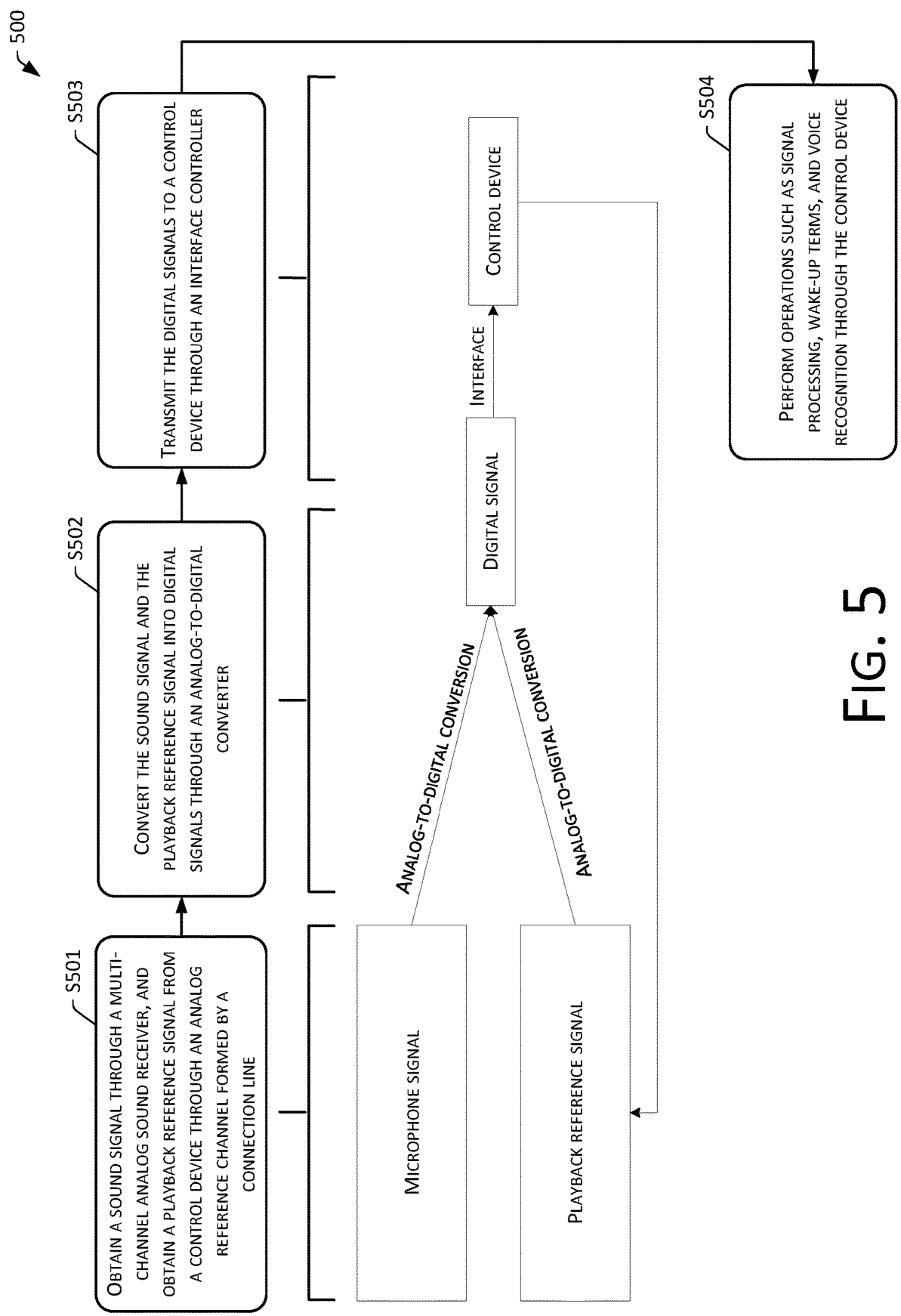
FIG. 5 is a flowchart of a sound collection method for far-field voice according to the embodiments of the present disclosure.

Based on the sound collection apparatus for far-field voice as shown in FIGS. 1-4, voice data acquisition 500 can be performed as follows, as shown in FIG. 5:

S501: Obtain a sound signal through the multi-channel analog sound receiver, and obtain a playback reference signal from the control device through the analog reference channel formed by the connection line.

S502: Convert the sound signal and the playback reference signal into digital signals through the analog-to-digital converter.

S503: Transmit the digital signals to the control device through the interface controller.

S504: Perform operations such as signal processing, wake-up terms, and voice recognition through the control device.

The sound collection apparatus for far-field voice will be described hereinafter in conjunction with particular embodiments. However, it is worth noting that the particular embodiments are only used for better explanation of the present disclosure and do not constitute an improper limitations to the present disclosure.

Figure 6:
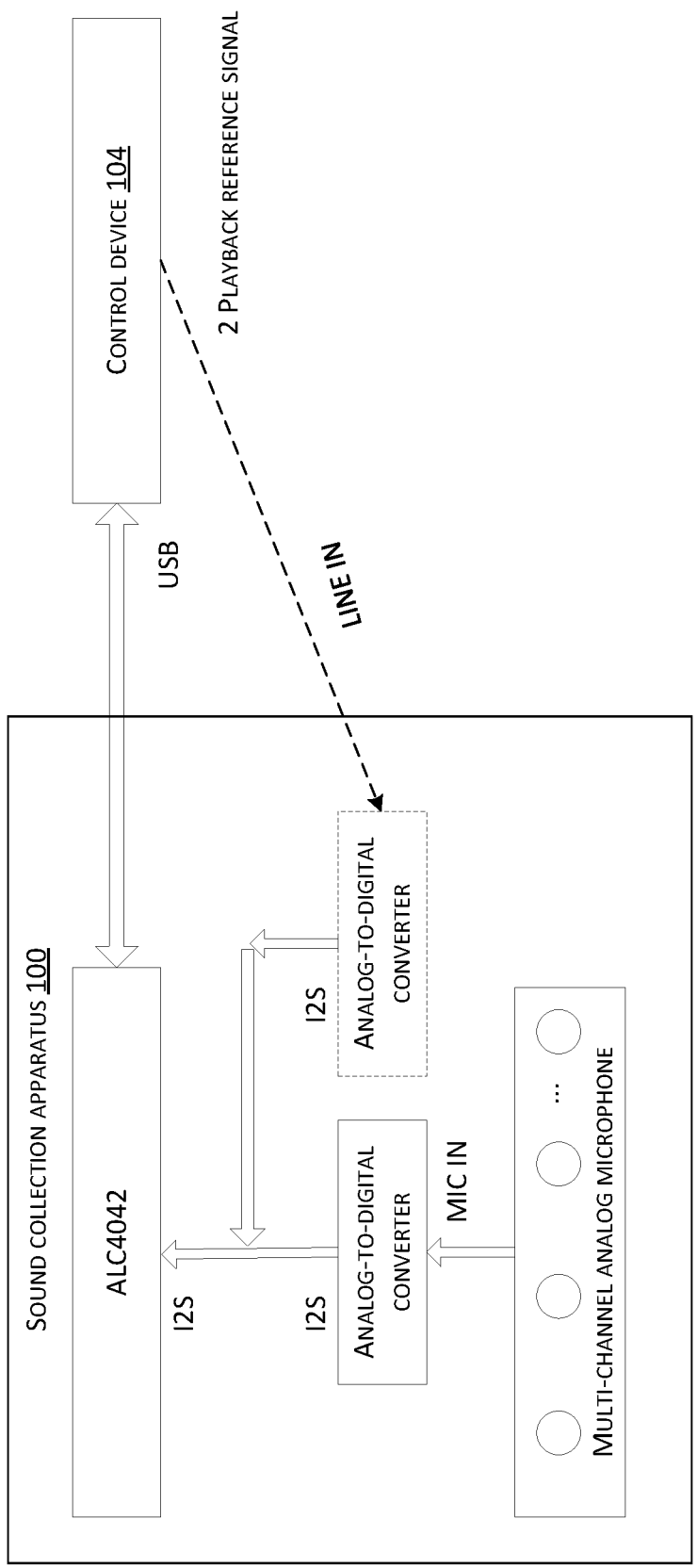
FIG. 6 is a schematic diagram of a specific example of a sound collection apparatus according to the embodiments of the present disclosure.

In the present example, voice data is acquired through a microphone array module. Specifically, as shown in FIG. 6, microphone signals (i.e., sound signals) are obtained through four analog microphones (4MIC), and playback reference signals (2Analog Ref) acquired from a control device through an analog reference channel. In other words, a total of 4 microphone signals and 2 analog reference signals, i.e., a total of 6 signals, are obtained. These 6 signals can be sent to an analog-to-digital converter (ADC) for analog-to-digital conversion. Specifically, an analog voice signal is converted into a digital signal. The converted digital signal is transmitted through an interface controller (for example, ALC4042 in FIG. 6) to the control device, on which voice interactive functions such as voice enhancement algorithms, voice recognition, semantic understanding, speech synthesis, content services, and the like, are implemented.

Each module unit in FIG. 6 is described in details as follows.

1) 4MIC is expressed as a sign of 4 analog microphones, which are used for converting sound signals into electrical signals. In order to ensure sufficient far-field collection effects, MIC can be selected mainly because MIC has advantages such as a high signal-to-noise ratio and a high sensitivity. The signal-to-noise ratio is required to be above 65 dB.

However, it is worth noting that the above only uses 4MIC as an example. In practical implementations, other types of MICs, such as 8MIC, can be used, and the number of channels in MIC can be selected according to actual requirements.

2) An analog reference channel can obtain 2Analog Ref, that is, two analog references. 2Analog Ref is an external sound emitted by the control device itself, and can be called an echo signal. Based on an acquired echo signal, an echo cancellation algorithm can eliminate the external sound and retain a user's voice, thereby eliminating the interference of the control device on the user's voice.

3) ALC4042, used for implementing audio data stream transmission of a USB interface. In implementations, ALC4042 can be used to support a 16K sample rate and 16-bit, 24-bit and 32-bit data sample transmissions.

4) An analog-to-digital converter, which can be the one as shown in FIG. 6, implements 8-channel data serial transmission through two pieces of 4-channel ADCs in parallel using a TDM mode of an I2S interface, and then package and send data to ALC4042.

The ADC can be selected, but is not limited to, one of the following models: CX20810, NAU85L40, AC108, etc.

The sound collection apparatus can be deployed as an external device, and can be plugged and unplugged through a USB interface or other form of interface, which is relatively convenient to use and has a better compatibility. The playback reference signal can be transmitted to the sound collection apparatus through a connection line drawn from the control device.

Furthermore, the sound collection apparatus has a relatively high level of integration, a good of sound collection performance, and a relatively low hardware cost.

The sound collection apparatus will be described hereinafter using a specific implementation setting.

Figure 7:
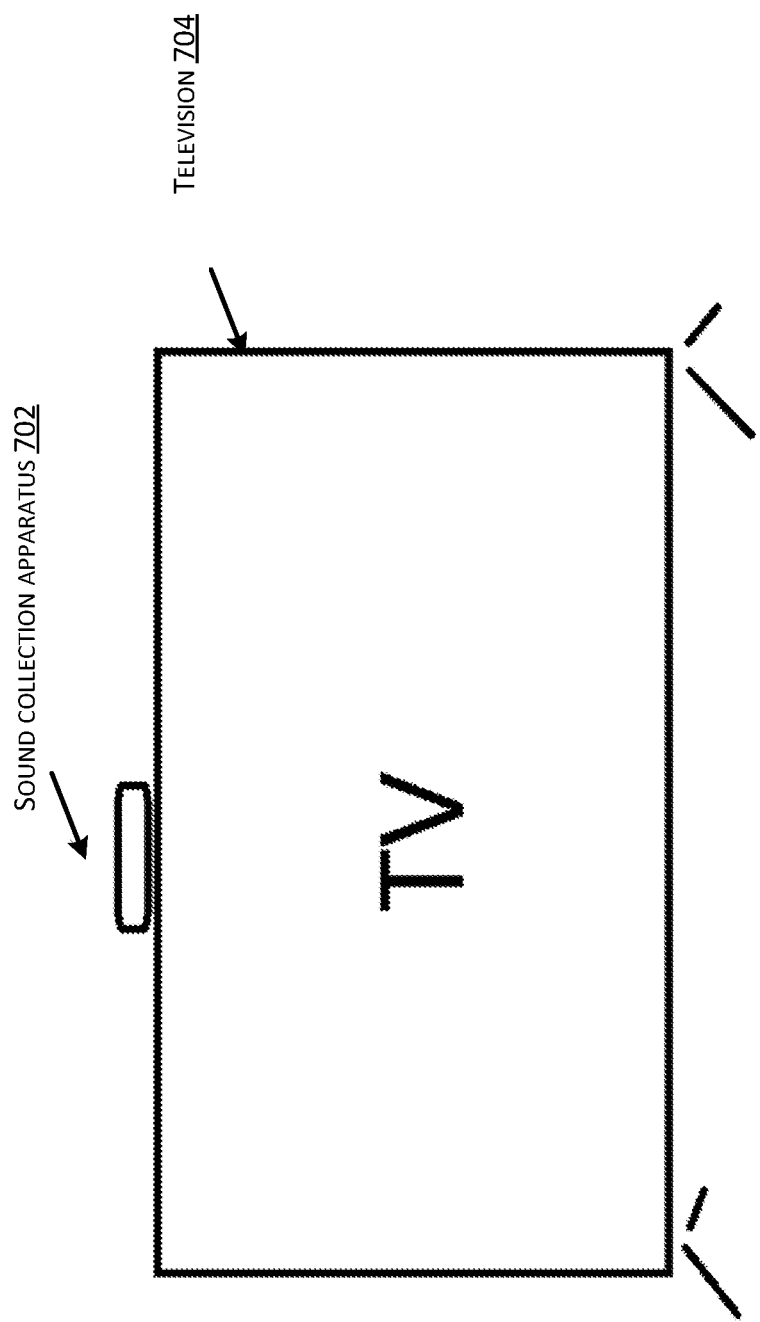
FIG. 7 is a schematic diagram of a scenario in which a sound collection apparatus is applied to a television according to the embodiments of the present disclosure.

The sound collection apparatus can be applied in a television set. The sound collection apparatus is integrated as a separate modular device with a USB plug. A playback reference signal can be transmitted to the sound collection apparatus in various ways. For example, transmission to the sound collection apparatus can be made through a wired means or a wireless means. For example, the wired means may be transmission to the sound collection apparatus through a dedicated connection line and the wireless means may be transmission of a playback reference signal to the sound collection apparatus directly through a wireless signal, which are not limited in the present disclosure. In the present example, transmitting a playback reference signal through a dedicated connection line is used as an example. An interface and a USB plug in the sound collection apparatus that are connected to this connection line can be integrated together. As shown in FIG. 7, the sound collection apparatus 702 is plugged into a corresponding interface of the television 704, and is thereby used for remote voice acquisition.

The sound collection apparatus may also be plugged into an external device of the television set, such as a set top box or the like. The sound collection apparatus is inserted into the set top box, and interactions between the sound collection apparatus and the television set are realized through interactions between the set top box and the television set.

In an embodiment, the sound collection apparatus may also be a functional module integrated in the television set, which is built in when the television is shipped from the factory.

By deploying the sound collection apparatus into the television, a user's remote voice can be acquired by the sound collection apparatus, and then the voice is transmitted to a main control chip of the television. Operations such as signal processing, wake-up terms and voice recognition, etc., are performed through the master chip.

In the embodiments of the present disclosure, an obtained sound signal is converted into an electrical signal by a multi-channel analog sound receiver, and the electrical signal is converted into a digital signal by an analog-to-digital converter. The converted digital signal is transmitted to a control device through an interface controller for processing sound data. This type of sound collection apparatus is relatively simple to implement and has a lower cost. As such, the technical problems of high hardware cost and unguaranteed performance of existing sound collection devices can be solved, and the technical effects of effectively reducing the hardware cost and the difficulties of development are achieved.

The above description is only exemplary embodiments of the present disclosure, and is not intended to limit the present disclosure. For one skilled in art, various changes and modifications can be made to the embodiments of the present disclosure. Any modifications, equivalent replacements, improvements, etc. that are made within the spirit and scope of the present disclosure should be included within the scope of protection of the present disclosure.

The present disclosure can be further understood using the following clauses.

Clause 1: A sound collection apparatus for far-field voice comprising: a multi-channel analog sound receiver configured to convert an obtained sound signal into an electrical signal; a first analog-to-digital converter coupled to the multi-channel analog sound receiver and configured to convert the electrical signal into a digital signal; and an interface controller coupled to the analog-to-digital converter and configured to transmit the digital signal to a control device via a preset interface.

Clause 2: The apparatus of Clause 1, further comprising a second analog-to-digital converter, the second analog-to-digital converter being coupled between the control device and the interface controller, and configured to receive and convert a playback reference signal of the control device to a digital signal, and transmit the digital signal to the interface controller, the playback reference signal being used for de-noising the sound signal.

Clause 3: The apparatus of Clause 2, wherein the first analog-to-digital converter is a 4-channel analog-to-digital conversion chip, and the second analog-to-digital converter is a 4-channel analog-to-digital conversion chip.

Clause 4: The apparatus of Clause 1, wherein the multi-channel analog sound receiver comprises a 4-channel analog sound receiver.

Clause 5: The apparatus of Clause 1, wherein a model of the analog-to-digital converter comprises at least one of: CX20810, NAU85L40, or AC108.

Clause 6: The apparatus of Clause 1, wherein the preset interface comprises a USB interface.

Clause 7: The apparatus of Clause 1, wherein the interface controller is ALC4042 chip.

Clause 8: The apparatus of any one of Clauses 1-7, wherein the control device comprises at least one of: a computer, a television, a set top box, a robot, or a smart speaker.

Clause 9: The apparatus of any one of Clauses 1-7, wherein the multi-channel analog sound receiver comprises a microphone array.

What is claimed is:

1. An apparatus comprising:
   a multi-channel analog sound receiver configured to convert a sound signal into an electrical signal;
   a first analog-to-digital converter coupled to the multi-channel analog sound receiver and configured to convert the electrical signal into a first digital signal;
   a second analog-to-digital converter coupled to a control device and configured to convert a playback reference signal to a second digital signal, the playback reference signal indicating an additional sound signal generated by the control device; and
   an interface controller coupled to the first analog-to-digital converter and the second analog-to-digital converter and configured to de-noise the first digital signal using the second digital signal to remove the additional sound signal and transmit the de-noised first digital signal to the control device via a preset interface.

2. The apparatus of claim 1, wherein the first analog-to-digital converter is a 4-channel analog-to-digital conversion chip, and the second analog-to-digital converter is a 4-channel analog-to-digital conversion chip.

3. The apparatus of claim 1, wherein the first analog-to-digital converter and the second analog-to-digital converter are integrated together as a single analog-to-digital converter.

4. The apparatus of claim 1, wherein the second analog-to-digital converter receives the playback reference signal of the control device through a dedicated connection line.

5. The apparatus of claim 1, wherein the multi-channel analog sound receiver comprises a 4-channel analog sound receiver.

6. The apparatus of claim 1, wherein a model of at least one of the first analog-to-digital converter and the second analog-to-digital converter comprises at least one of: CX20810, NAU85L40, or AC108.

7. The apparatus of claim 1, wherein the preset interface comprises a USB interface.

8. The apparatus of claim 1, wherein the interface controller is ALC4042 chip.

9. The apparatus of claim 1, wherein the control device comprises at least one of: a computer, a television, a set top box, a robot, or a smart speaker.

10. The apparatus of claim 1, wherein the multi-channel analog sound receiver comprises a microphone array.

11. The apparatus of claim 1, wherein a signal-to-noise ratio of the multi-channel analog sound receiver is at least above 65 dB.

12. The apparatus of claim 1, wherein the apparatus is a separate modular device with a USB plug.

13. The apparatus of claim 1, wherein the apparatus is integrated in the control device.

14. The apparatus of claim 13, wherein the digital signal is subjected to processing of a voice interactive function by the control device.

15. The apparatus of claim 14, wherein the voice interactive function comprises at least one of voice enhancement, voice recognition, semantic understanding, speech synthesis, or content services.

16. A method comprising:
   converting, by a multi-channel analog sound receiver, a sound signal into an electrical signal;
   converting, by a first analog-to-digital converter coupled to the multi-channel analog sound receiver, the electrical signal into a first digital signal;
   converting, by a second analog-to-digital converter coupled to a control device, a playback reference signal to a second digital signal, the playback reference signal indicating an additional sound signal generated by the control device;
   de-noising, by an interface controller coupled to the first analog-to-digital converter and the second analog-to-digital converter, the first digital signal using the second digital signal to remove the additional sound signal; and
   transmitting, by the interface controller, the de-noised first digital signal to the control device via a preset interface.

17. The method of claim 16, further comprising processing, by the control device, the first digital signal according to a voice interactive function, the voice interactive function comprising at least one of voice enhancement, voice recognition, semantic understanding, speech synthesis, or content services.

* * * * *